(12) United States Patent
Gross et al.

(10) Patent No.: US 9,353,945 B2
(45) Date of Patent: May 31, 2016

(54) OXY-FUEL COMBUSTION SYSTEM WITH CLOSED LOOP FLAME TEMPERATURE CONTROL

(75) Inventors: Dietrich M. Gross, Wilmette, IL (US); Brian R. Patrick, Chicago, IL (US); Mark Schoenfield, Wilmette, IL (US)

(73) Assignee: Jupiter Oxygen Corporation, Schiller Park, IL (US)

( * ) Notice: Subject to any disclaimer, the term of this patent is extended or adjusted under 35 U.S.C. 154(b) by 0 days.

(21) Appl. No.: 12/275,456

(22) Filed: Nov. 21, 2008

(65) Prior Publication Data

US 2010/0062381 A1 Mar. 11, 2010

Related U.S. Application Data

(60) Provisional application No. 61/096,106, filed on Sep. 11, 2008.

(51) Int. Cl.
| | |
|---|---|
| *F23N 1/02* | (2006.01) |
| *F27B 1/26* | (2006.01) |
| *F27D 17/00* | (2006.01) |
| *F27B 5/14* | (2006.01) |
| *F22B 37/10* | (2006.01) |
| *F23N 5/00* | (2006.01) |

(52) U.S. Cl.
CPC .. *F23N 5/00* (2013.01); *F23N 1/02* (2013.01); *F23N 1/022* (2013.01); *F23N 2037/28* (2013.01)

(58) Field of Classification Search
CPC .............. F23N 1/02; F23N 1/022; F23N 5/00
USPC .............. 431/1, 12; 432/36, 39, 54, 213; 122/235.11
See application file for complete search history.

(56) References Cited

U.S. PATENT DOCUMENTS 4,118,172 A * 10/1978 Noir et al. ........................ 431/12
4,193,773 A * 3/1980 Staudinger ...................... 48/210
(Continued)

FOREIGN PATENT DOCUMENTS

| FR | 1343944 | 10/1963 |
|---|---|---|
| GB | 1091893 | 11/1967 |

(Continued)

OTHER PUBLICATIONS

Flame Temperatures some Comomon Gases—The Engineering Tool Box, See http://www.engineeringtoolbox.com/flame-temperatures-gases-d_422.html.*
(Continued)

*Primary Examiner* — William G Corboy
(74) *Attorney, Agent, or Firm* — Katten Muchin Rosenman LLP

(57) ABSTRACT

A control system for an oxy-fuel combustion process is disclosed for use with a boiler or furnace which dynamically controls the flame temperature of each burner involved in the combustion process to dynamically maximize the flame temperature. The boiler or furnace used in conjunction with the combustion process in accordance with the present invention is configured with a radiant, i.e. line of sight, heat zone and a convective heat zone. By dynamically maximizing the flame temperature of the various burners within the boiler or furnace, the radiant heat transfer is optimized. By optimizing the radiant heat transfer within the boiler or furnace, the efficiency of the boiler or furnace is significantly improved.

4 Claims, 7 Drawing Sheets

(56) References Cited

U.S. PATENT DOCUMENTS

| | | | |
|---|---|---|---|
| 4,223,873 | A | 9/1980 | Battles |
| 4,451,003 | A * | 5/1984 | de Mena et al. ............... 236/14 |
| 4,516,929 | A * | 5/1985 | Hiroi et al. ..................... 431/12 |
| 4,645,450 | A * | 2/1987 | West .............................. 431/12 |
| 5,545,031 | A | 8/1996 | Joshi |
| 5,575,637 | A | 11/1996 | Slavejkov |
| 5,611,833 | A * | 3/1997 | Brahmbhatt et al. .......... 65/21.3 |
| 5,997,596 | A * | 12/1999 | Joshi et al. ................... 48/198.1 |
| 6,042,365 | A | 3/2000 | Chen |
| 6,299,433 | B1 | 10/2001 | Gauba et al. |
| 6,318,891 | B1 | 11/2001 | Haffner et al. |
| 6,398,547 | B1 | 6/2002 | Joshi |
| 6,659,026 | B1 | 12/2003 | Hendricks et al. |
| 7,516,620 | B2 * | 4/2009 | Patrick et al. .................. 60/653 |
| 2004/0046293 | A1 * | 3/2004 | Gross ............................ 266/221 |
| 2005/0072379 | A1 | 4/2005 | Gross |
| 2005/0153252 | A1 * | 7/2005 | Crawley et al. ................... 431/5 |
| 2007/0207419 | A1 | 9/2007 | Patrick |
| 2009/0142717 | A1 * | 6/2009 | Lavelle .......................... 431/12 |
| 2009/0308331 | A1 * | 12/2009 | D'Agostini et al. ....... 122/13.01 |

FOREIGN PATENT DOCUMENTS

| | | |
|---|---|---|
| JP | 63-315829 | 12/1988 |
| JP | 08-270931 | 10/1996 |
| JP | 2004-251617 | 9/2004 |
| JP | 2006-145198 | 6/2006 |
| WO | WO02/088400 | 11/2002 |
| WO | WO2006/054990 | 5/2006 |
| WO | WO 2006/094182 | 9/2006 |

OTHER PUBLICATIONS

Carlos et al., "Spectrometer-Based Combustion Monitoring for Flame Stoichiometry and Temperature Control", *Applied Thermal Engineering*, vol. 25, Issues 5-6, Apr. 2005, pp. 659-676.

Stultz et al., "Steam: Its Generation and Use", Babcock & Wilcox Company, 40$^{th}$ ed. Copyright 1992, p. 12-3.

Baushik Biswas et al., "Stochastic Time Series Analysis of Pulsating Buoyant Pool Fires," Proceedings of the Combustion Institute 31 (2007) Elsevier, Inc., Copyright 2006, pp. 2581-2588.

* cited by examiner

OXY-FUEL COMBUSTION SYSTEM WITH CLOSED LOOP FLAME TEMPERATURE CONTROL

CROSS REFERENCE TO RELATED APPLICATIONS

This application claims priority to and the benefit of U.S. Patent Application No. 61/096,106, filed on Sep. 11, 2008, hereby incorporated by reference.

BACKGROUND OF THE INVENTION

1. Field of the Invention

The present invention relates to an oxygen fuel (oxy-fuel) combustion system and more particularly to combustion system for fossil fuels that utilizes oxygen for combustion that includes closed loop control of the flame temperature in order to maximize the radiation heat transfer of the combustion thereby optimizing the efficiency of combustion system while maintaining the design aluminum melting or holding temperature or steam or process temperature and interior material temperatures.

2. Description of the Prior Art

Combustion systems for fossil fuels, i.e carbon based fuels, which utilize oxygen for combustion in lieu of air relatively well known in the art. Examples of such systems are disclosed in International Patent Application Publication No. WO 02/088400, assigned to the same assignee as the present invention, and U.S. Pat. No. 6,398,547. Such combustion systems have come to be known as oxy-fuel combustion systems and are used in various industrial processes including the production of steam in connection with electric power generating process and the melting of aluminum, for example. These oxy-fueled combustion systems have been developed to overcome various disadvantages of air-fueled combustion systems.

For example, a major disadvantage of air-fueled combustion systems is the production of green-house gasses, which are known to be harmful to the environment. In particular, air is comprised of about 79% nitrogen and 21% oxygen. In such air fueled combustion processes, $NO_x$ and other green-house gasses, such as carbon dioxide $CO_2$ and sulfur dioxide $SO_2$ are produced as a result of the combustion process.

Another disadvantage of such air-fueled combustion processes relates to fuel efficiency. In such air-fueled combustion processes, a considerable amount of fuel is expended to heat the nitrogen in the boiler or furnace. For example, considering a process for producing steam, enough heat must be created in the boiler by the combustion process to cause a sufficient amount of energy to be transferred to the water to cause the water to flash over to steam. Because of the vast amount of nitrogen in the boiler or furnace, a significant amount of heat and thus fuel are wasted heating the nitrogen in the boiler or furnace, which is processed and released as waste.

Such oxy-fuel combustion systems solve these problems and utilize relatively pure oxygen that is from about 85% to 99%+ pure. By using relatively pure oxygen, the amount of green house gasses is reduced and the efficiency of the fuel is significantly improved. Because of the relatively high cost of producing, such relatively pure oxygen, further attempts have been made to further increase the efficiency of said oxy-fuel combustion systems. For example, U.S. Pat. Nos. 5,545,031 and 5,575,637 disclose improved burners for use in oxy-fuel combustion systems which are configured to provide a relatively larger flame surface for improving the radiant heat transfer. The systems disclosed in the '031 and '637 patents do well to improve the radiant heat transfer in an oxy-fueled combustion process and thus improve the efficiency of the oxy-fuel combustion process. However, the improvements disclosed in these patents involve fixed variables in the combustion process, namely flame shape, and do not take into account other variables, such as the amount of fuel used in the combustion process.

As such, other developments have concentrated on controlling the amount of fuel supplied to the individual burners with the boiler or furnace for different stoichiometric ratios. More particularly, U.S. Pat. No. 6,398,547 discloses an oxy-fuel combustion system which includes a burner control system in which the fuel to each of the individual burners is periodically oscillated between a fuel lean mode and a fuel rich mode control over a relatively wide range of stoichiometric ratios. By oscillating the amount of fuel provided to the individual burners, the amount of excess fuel and oxygen in the boiler or furnace can be controlled to improve the efficiency of the combustion process.

Although the system disclosed in the '547 patent improves the efficiency of fuel usage in oxy-fuel combustion systems, the control system is fixed and is based upon a fixed waveform that is loaded into the system prior to the initiation of the combustion process. However, dynamic variables in the combustion process, such as flame temperature, are also known to affect the efficiency of the oxy-fuel combustion process. In particular, flame temperature is known to be a function of the amount of oxygen supplied to the burner. As set forth in the literature, for example, "Spectrometer-Based Combustion Monitoring for Flame Stoichiometry and Temperature Control", by Carlos Romero, Xianchang Li, Shahla Keyvan and Rodney Rossow, *Applied Thermal Engineering*, Volume 25, Issues 5-6, April 2005, Pages 659-676, hereby incorporated by reference, "overall furnace (or boiler) stoichiometry control does not preclude inefficient operation of individual burners due to local maldistributions of air and fuel, or malfunction of burner hardware." Thus, even though known oxy-fuel boilers and furnaces are known to be controlled from a stoichiometric standpoint to within ±5%, the flame temperature may vary during a combustion cycle for the reasons set forth above.

Thus, there is a need for a system that is responsive to changes in dynamic combustion variables, such as flame temperature, for improving the efficiency of the combustion process.

SUMMARY OF THE INVENTION

The present invention relates to a control system for an oxy-fuel combustion process for use with a boiler or furnace which dynamically controls the flame temperature of each burner involved in the combustion process to dynamically maximize the flame temperature. The boiler or furnace used in conjunction with the combustion process in accordance with the present invention is configured with a radiant, i.e. line of sight, heat zone and a convective heat zone. By dynamically maximizing the flame temperature of the various burners within the boiler or furnace, the radiant heat transfer is optimized. By optimizing the radiant heat transfer within the boiler or furnace, the efficiency of the boiler or furnace is significantly improved.

DESCRIPTION OF THE DRAWING

These and other advantages of the present invention will be readily understood with reference to the following specification and attached drawing wherein.

DETAILED DESCRIPTION

The present invention relates to a control system for an oxy-fuel combustion process which dynamically controls the flame temperature of each burner involved in the combustion process to dynamically maximize the flame temperature while maintaining the design, steam or process temperature and interior material temperatures. Although the combustion process in accordance with the present invention is described in terms of a boiler, the principles of the present invention are equally applicable to furnaces, for example, for processing aluminum while maintaining the designed aluminum melting or holding temperature or steam or process temperatures and internal material temperatures.

As will be discussed in more detail below, the boiler used in conjunction with the combustion process in accordance with the present invention is configured with a radiant, i.e. line of sight, heat zone and a convective heat zone. By dynamically maximizing the flame temperature of the various burners within the boiler, the radiant heat transfer is optimized. By optimizing the radiant heat transfer within the boiler, the efficiency of the boiler is significantly improved.

Figure 1:
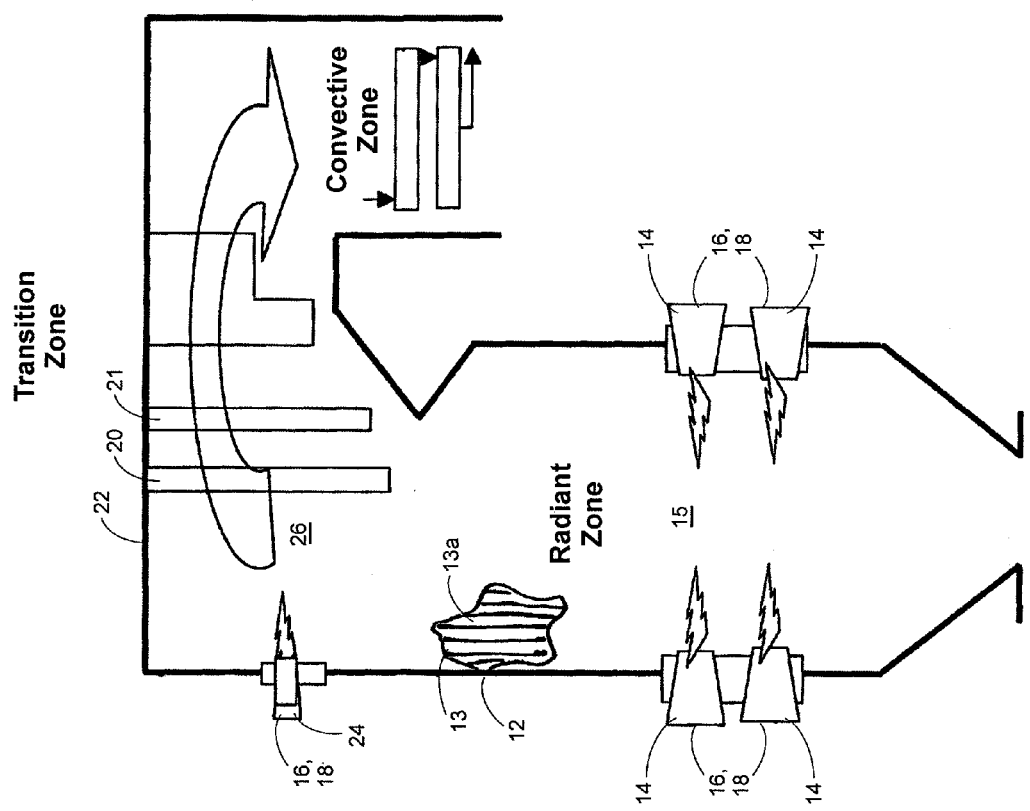
FIG. 1 is a simplified physical diagram of a boiler for use with the combustion process in accordance with the present invention.

Referring to FIG. 1, an exemplary boiler for use in conjunction with the combustion process in accordance with the present invention is illustrated. The boiler, generally identified by the reference numeral 10, includes a series of water tubes 12, which together form a water wall 13, as shown in breakaway section in FIG. 1. The water wall 13 in boiler 10 may be formed from a myriad of water tubes 13a extending from the primary burner zone 15 to the upper regions of the boiler 10.

The boiler 10 further includes at least one primary burner 14, located in primary burner zone 15, connected to a source of fuel 16 and oxygen 18. As used herein, the term "substantially pure oxygen" is to be understood to mean the degree of purity of oxygen as needed to provide the correct ratio of fuel and oxygen for the desired burn and by products without departing from the novel scope of the present invention, for example, substantially pure oxygen 85% to 99%+ pure.

The boiler 10 may further include a super-heater 20 and/or re-heater 21, of types well known in the art. Such super-heaters 20 are generally fed with steam that has been produced in the boiler 10, at a steam transfer area 22. The steam passes within the super-heater 20, and convection currents carry heat or energy from combustion, and heat and energy radiated from the water tubes 13a, on and about the super-heater 20, heating the steam carried therein. Re-heaters 21 are typically fed with steam returning to the boiler from a turbine that steam requiring further heating before it is returned to the turbine for additional use. This heat or energy is transferred to the steam causing its temperature to rise above the saturation point of the steam; making the steam more suitable for use in turbines. It will be understood that cooling features can be included such that steam having too high a temperature and/or too much energy for the desired task can be attenuated as needed.

The boiler 10 may include a secondary burner 24, placed in locations above the I burner zone 15 of a boiler 10 and below the steam transfer area 22, for example, as described in US Patent Application No. US 2005/0072379 A1, assigned to the same assignee as the present invention and hereby incorporated by reference. At least one secondary burner 24 may be placed in the superheat area 26. Secondary burners 24 may also be located in numerous other locations of the boiler 10.

FIG. 1 illustrates the radiant and convective heat zones for the boiler 10 for a boiler configured without any secondary burners 16. As shown, the burner zone 15 corresponds to a radiant heat zone In as much as the water wall 13 is in the line of sight of the burners 16, the radiant zone is essentially all radiant heat transfer. The area to the right of the radiant zone is identified as a transition zone. The transition zone is known to contain both radiant and convective heat transfer. To the right of the transition zone is a convective heat transfer zone. The convective heat zone includes basically all convective heat transfer.

Figure 2:
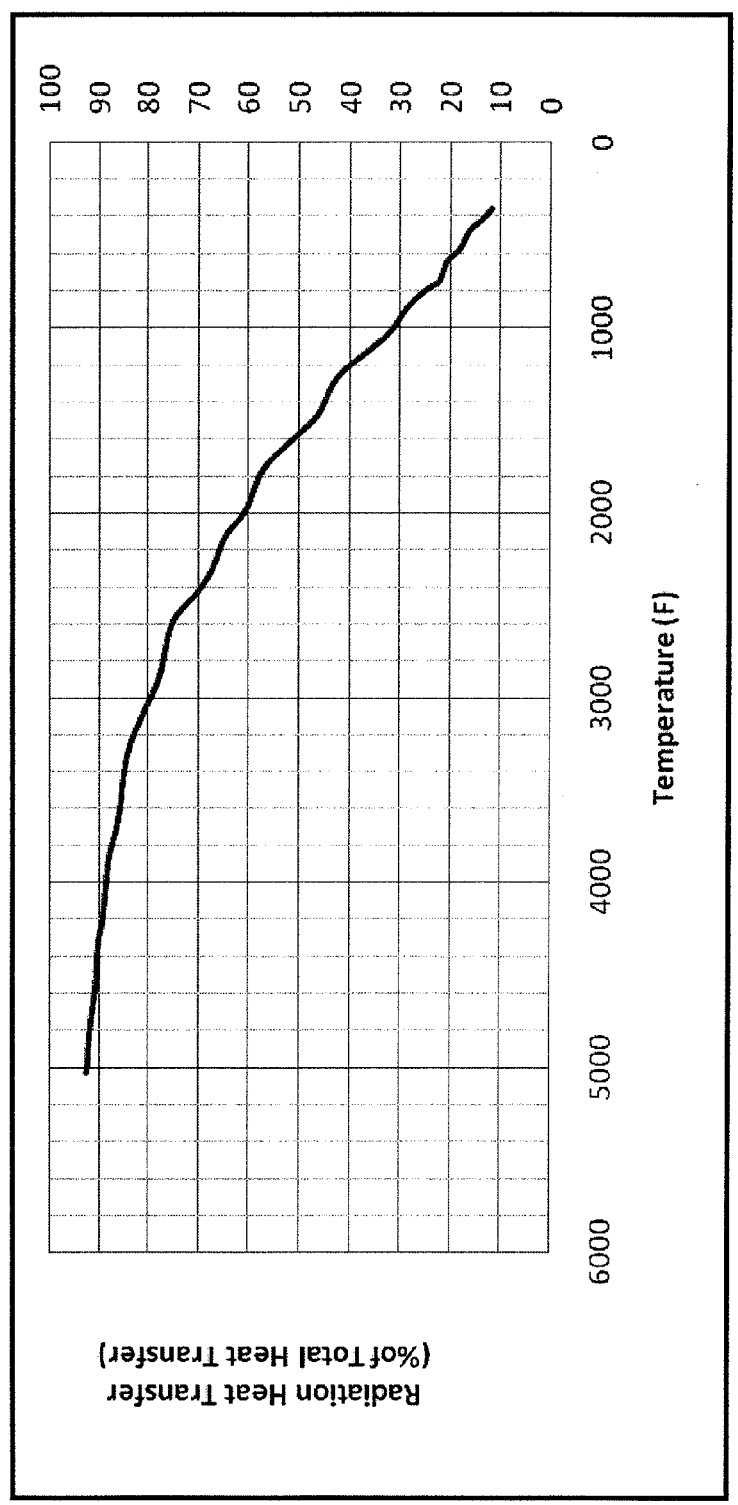
FIG. 2 is a graphical illustration of the flame temperature as a function percentage of radiant heat transfer.

As shown in FIG. 2, the percentage of radiant heat transfer relative to the total heat transfer is shown as a function of heat transfer. The horizontal axis represents flame temperature in ° F. The vertical axis represents radiant heat transfer as a percentage of the total heat transfer The curve illustrated in FIG. 2 indicates that the radiant heat transfer is proportional to $T^4$, where T=the flame temperature. As shown, the radiant heat transfer increases with the increase of flame temperature and asymptotically approaches 90%+ at a maximum flame temperature of over 5000° F. Thus, by dynamically maintaining the maximum flame temperature, the radiant heat transfer is optimized for a combustion cycle.

Various techniques are known for determining the flame temperature. For example, the flame temperature may be calculated. In particular, for a combustion process that takes place adiabatically, the temperature of the reaction products, in this case relatively pure oxygen and a fossil fuel, such as, natural gas or pulverized coal, is referred to as the adiabatic flame temperature. This adiabatic temperature is the maximum temperature possible for the reactants. Heat transfer, incomplete combustion, and dissociation of the reaction products can all result in lower temperature. As is known in the art, the maximum adiabatic flame temperature for a given fuel and oxidizer combination occurs when the reactants are mixed in a stoichiometric ratio, i.e correct proportions of the fuel and the oxygen so that all of the fuel and all of the oxidizer are totally consumed during combustion. Thus, the maximum flame temperature can be maintained by maintaining the stoichiometric ratio of the fuel and the oxygen.

Exemplary equations for determining the stoichiometric ratio of the oxygen and pulverized coal are provided below. Equations (1) and (2) are for determining the amount of oxygen required for combustion with pulverized coal at the stoichiometric ratio. Equation (3) is for determining the amount of oxygen required for combustion with natural gas at the stoichiometric ratio.

$$\text{(coal feed rate in LB/hr)*(carbon content in wt \%)*} \\ (1/12)*32 = \text{oxygen flow rate in lb/hr} \quad (1)$$

Alternatively, Equation (1) expressed as shown below in Equation (2)

$$\text{(coal feed rate in LB/hr)*(carbon content in wt \%)*} \\ (1/12)*386.8 = \text{oxygen flow rate in SCFH@70° F.} \quad (2)$$

Equations (1) and (2) are used to yield a stoichiometric ratio without dilution of the pulverized coal by either oxygen or other gas, such as $CO_2$, or $N_2$.

Both volumetric and gravimetric belt feeders for pulverized coal are known. Each type includes a Total Fuel Flow Controller (not shown), for example, as illustrated in "Steam: Its Generation and Use', by Stultz et al, 40th edition, published by the Babcock & Wilcox Company, Copyright 1992, page 12-3, hereby incorporated by reference The coal feed rate can be measured at the Total Fuel Flow Controller. Alternatively, for volumetric type pulverized coal systems, a fuel flow representative signal can be easily derived. More particularly, in such volumetric type pulverized coal systems, the pulverized coal is driven by a rotary screw pump, which, in turn, is driven by an electric motor. The revolutions of the electric motor is indicative of the volume of the pulverized coal. Thus, the revolutions per minute (RPM) of the electric motor can be used to provide a signal indicative of pulverized coal flow rate.

The carbon content of the pulverized coal is generally stable for a particular type of coal. The carbon content of a particular type of coal is based on an analysis of the particular coal, for example, by a conventional test. The pulverized flow rate signal and a signal representative of the carbon content may be applied to a computer processing unit (CPU) or a programmable controller to determine the amount of oxygen required to maintain the stoichiometric ratio of the oxygen and the fuel on the fly in response to changes in the pulverized coal flow rate due, for example, to changes in process conditions. By maintaining the stoichiometric ratio of the pulverized coal and the oxygen, the system is able to dynamically maintain the maximum flame temperature for a relatively wide range of process conditions.

For natural gas fuels, the stoichiometric ratio may be determined by Equation (3) neglecting hydrocarbons which are normally relatively low.

SCFH=2*(flow rate of natural gas in SCFH)*(1−(% inerts in NG/100))    (3)

The "inerts" refer to the inert gases contained in the natural gas and are determined by conventional tests. In oxy-fuel combustion systems that use natural gas as a fossil fuel, the flow rate of the natural gas is obtained in a conventional manner. Signals representative of the natural gas flow rate and the % inerts in the natural gas per 100 cubic feet ("NG100") may be applied to a CPU or programmable controller to determine the amount of oxygen required to maintain the stoichiometric ratio of the oxygen and the fuel on the fly in response to changes in the natural gas flow rate due, for example, to changes in process conditions. By maintaining the stoichiometric ratio of the pulverized coal and the oxygen, the system is able to dynamically maintain the maximum flame temperature for a relatively wide range of process conditions.

With either fuel, the system may check the level of unburned oxygen in the flue gas to adjust the oxygen flow rate. The level of unburned oxygen in the flue gas may be sensed by a conventional oxygen sensor disposed in the stream of the flue gas.

It is also known that the flame temperature can be measured by way of soot particle radiation. In particular, it is known that the combustion process results in the emission of soot particles. The radiation emitted by the soot particles can be used as a measure of the adiabatic flame temperature. More particularly, as set forth in U.S. Pat. No. 6,318,891, hereby incorporated by reference, the chemiluminescence radiation emitted by the flame is detected using an optical sensor fiber and a spectrograph. The adiabatic flame temperature is determined from the chemiluminescence radiation. Numerical methods for calculating the flame temperature based upon radiation spectral intensity measurements of the flame, are described in detail in "Stochastic Time Series Analysis of Pulsating Buoyant Pool Fires", by Kaushik Biswas, Yuan Zheng, Chul Han Kim and Jay Gore, Proceedings of the Combustion Institute 31 (2007), published by Elsevier, Inc, Copyright 2006, pages 2581-2588, hereby incorporated by reference.

Figure 3:
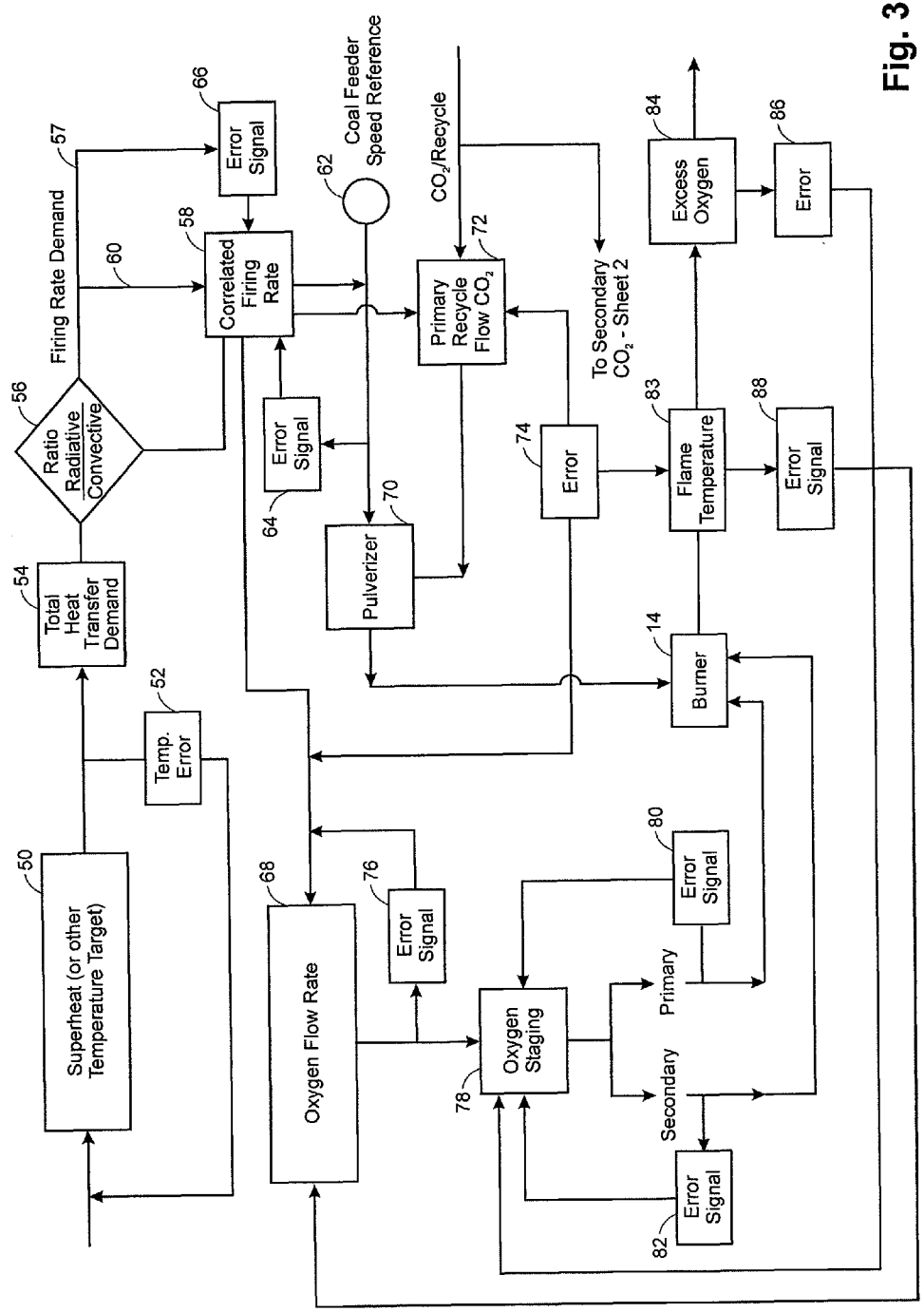
FIGS. 3 and 4 represent a process control diagram for the closed loop control system in accordance with the present invention.
Figure 4:
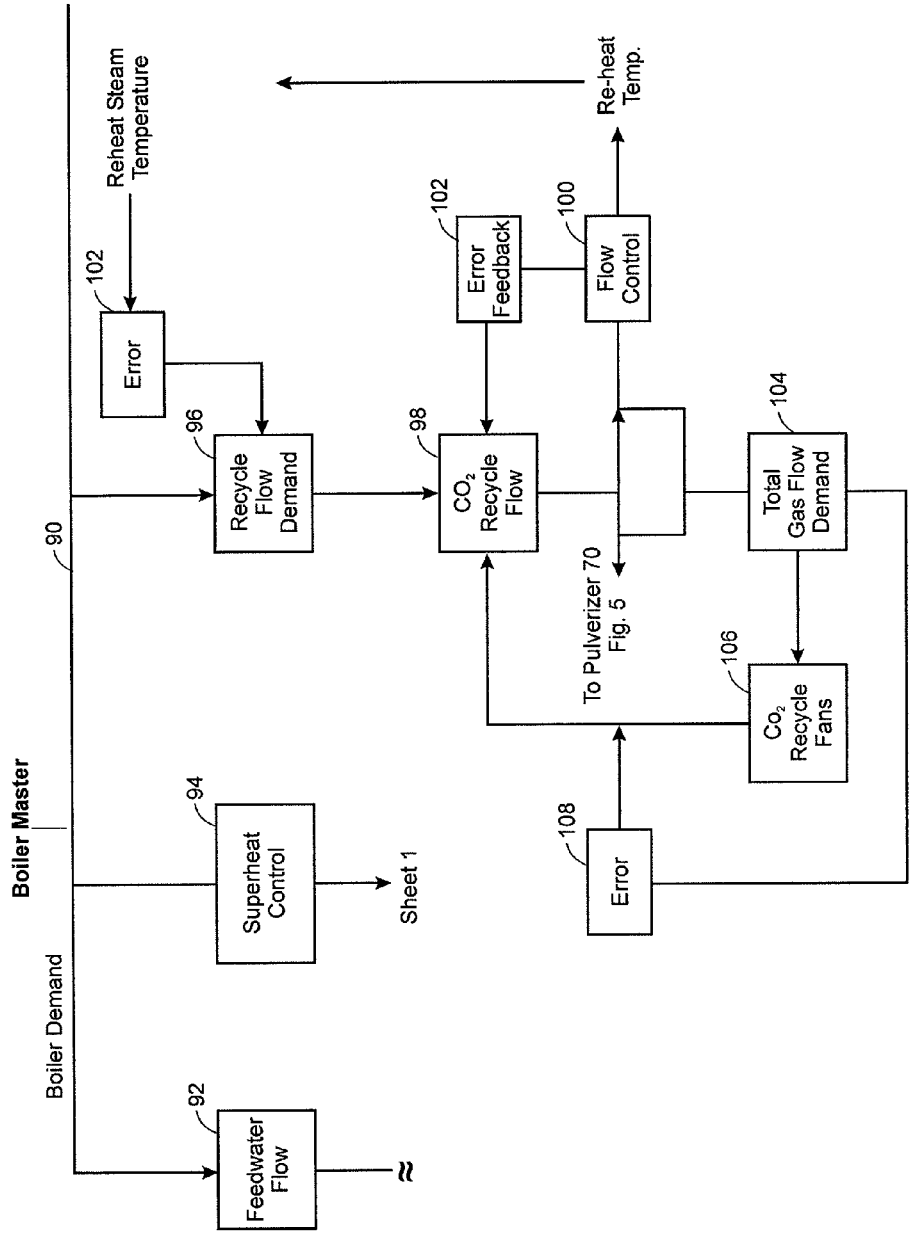

An exemplary control diagram which implements the present invention is illustrated in FIGS. 3 and 4. FIG. 3 illustrates the combustion system control loop. FIG. 4 illustrates the boiler system control loop.

Referring first to FIG. 3, as indicated by the block 50, the primary target temperature set point, as an example, is the superheat temperature set point of the boiler. Other primary temperature set point could include the temperature of the water wall 13 (FIG. 1) or various other primary temperature set points. These temperatures are measured, for example, by thermocouples, disposed adjacent the temperature target. In the example above in which the superheat temperature is the primary target temperature, the thermocouple is disposed at the output of the super-heater 20 (FIG. 1) in a well known manner.

The temperature of the super-heater 20 (FIG. 1) is compared with a set point. The measured temperature is compared with the temperature set point for the super-heater 20. If the measured temperature differs from the temperature set point, an error signal 52 (FIG. 3) is generated. The error (difference) signal 52 is used to generate a signal representative of the total heat transfer demand 54. In steady state conditions, the total heat transfer demand signal 54 is used to generate a firing rate demand signal that is used to maintain the boiler firing rate at a predetermined level. More particularly, the firing rate demand signal, available on line 57 is fed to a correlated firing rate controller 58. The correlated firing rate, as represented by the box 58, is a signal representative of the increase in fuel demand of the combustion system, which, in accordance with the present invention, is trimmed by the optimized radiant heat transfer, which results in an increase in efficiency and thus fuel savings.

During steady state conditions, the firing rate command signal, available on line 57, is applied to the correlated firing rate controller 58 along line 60. This firing rate demand signal 57 is compared with a fuel supply rate reference signal 62, for example, a coal feeder speed reference signal. If the fuel supply rate, available from the fuel rate supply reference signal 62, corresponds to the current firing rate, the error signal 66 will be zero and the current fuel supply rate will be maintained.

Should the firing rate demand signal, available on line 57, indicate an additional or reduced demand, the firing rate error signal 66 is generated Based upon the difference between the firing rate demand signal 57 and the fuel supply rate reference signal 62, in order to adjust the actual coal or other fuel flow to the desired amount. The correlated firing rate signal is also applied to an oxygen flow rate controller 68 to control the oxygen flow rate and the fuel flow rate, i.e. the pulverizer. 70, for example. In this example, the pulverizer 70 generates its own error signal 64 to correlate the desired coal flow rate to actual flow rate determined by factors in the pulverizer, as generally known in the art.

In solid fuel applications, i.e coal, a primary recycle flow rate controller 72 is used to control the amount of recycled flue gas needed to propel the solid fuel through the pulverizer, for example, to the burner 14 (FIG. 1). The recycle flue gas is normally available from primary flue gas supply fans. The output of the primary recycle flow rate controller 72 is monitored and an error signal 74 is generated in order to maintain the desired fuel flow rate and transport velocity and to minimize the amount of recycle flue gas in order to maintain to maximum flame temperature.

The oxygen flow rate controller 68 receives an input from the correlated firing rate controller 58 which sets at stoichiometric ±5%. A flow monitoring device (not shown) may be used to measure the actual flow of oxygen and an error signal is generated in order to maintain the proper amount of oxygen.

Oxygen staging, as indicated by the box 78, may be in order to split the oxygen into primary and secondary flow paths. The multiple oxygen flow paths may be used to change the geometry of the flame, adjust flame stability and minimize $NO_x$ emissions. Each oxygen flow path may be equipped with a flow monitoring device (not shown) which generates an error signal 80, 82 which is then used to correct the actual flow rate to the burners 14 (FIG. 1) to the desired flow rate. The burners 14 receive physical flow inputs from the primary and secondary oxygen paths and the fuel source; a pulverizer 70 in this example.

As mentioned above, flame temperature, represented by the box 83, may be calculated by adiabatic computation based upon the chemical inputs of the fuel, oxygen and recycled flue gas or alternatively measured by soot particle radiation. The error signal 74 may be generated when solid fuels are used to in order to adjust the input of primary recycle flue gas and oxygen in order to maintain maximum flame temperatures. Excess oxygen is monitored post combustion, as indicated by the box 84 and an error signal 86 is generated to the set point, for example, stoichiometric ±5%. This error signal is then fed back in to the oxygen flow rate 68.

In accordance with an important aspect of the invention, the maximum flame temperature is maintained by closed loop control. For multi-burner boilers, this is done on a burner by burner basis. In particular, should the flame temperature 83 for any burner drop below the maximum expected flame temperature, an error signal 88 is generated and fed back to the oxygen flow rate controller 68. When the flame temperature 83 drops below the maximum flame temperature, for example, 5100° F., the oxygen flow rate is increased. The maximum flame temperature is predetermined for different oxygen purity levels. The predetermined maximum temperature is compared with the flame temperature signal 83, as discussed above, and used to generate the error signal 88.

Referring to FIG. 4, the boiler control loop is illustrated. In general, the boiler demand signal, indicated on line 90 comes from power station controls. In this example, it is a steam flow rate input desired from the boiler. The feedwater controller 92 is driven by the boiler master 90 in order to increase or decrease or maintain steam flow. For example, if the feedwater flow rate is increased, the temperature in the boiler will decrease thus increasing the need for superheat temperature thus increasing fuel demand. The superheat controller or primary control 94 relates to the closed loop temperature control, illustrated in FIG. 3.

The recycle flow demand or secondary temperature controller 96, in is example, is for controlling the steam temperature of the re-heater 21 (FIG. 1). The re-heat steam temperature is a closed loop controller for maintaining the re-heat steam temperature at a set point. The recycle flow demand relates to recycled flue gases for use with solid fuels, such as pulverized coal. This recycle flow demand drives a $CO_2$ Recycle Flow Controller 98 used to control the $CO_2$ recycle flow input from the $CO_2$ recycle flue gas fans. The output of the Recycle Flow Controller 98 is used to control the pulverizer fuel rate 70 (FIG. 1) and the recycled flue gas flow rate 100 (recycled flue gas for secondary temperature control, in this example re-heat). The flow is monitored and an error signal 102 is generated and the recycled flue gas flow rate is adjusted, as necessary. Additionally, an error signal 102 is derived from the secondary temperature set point, in this case re-heat temperature, and the recycled flue gas amount is adjusted to recycled flue gas demand 96.

The total gas flow demand controller 104 is used to determine the total gas flow demand. The output of the total gas flow demand controller 104 is used to control the flue gas recycle fans 106. An error signal 108 is generated based on the difference between demand and actual recycle flue gas flow. The demand difference is then outputted to the fan to either increase or decrease or maintain flue gas flow.

Figure 7:
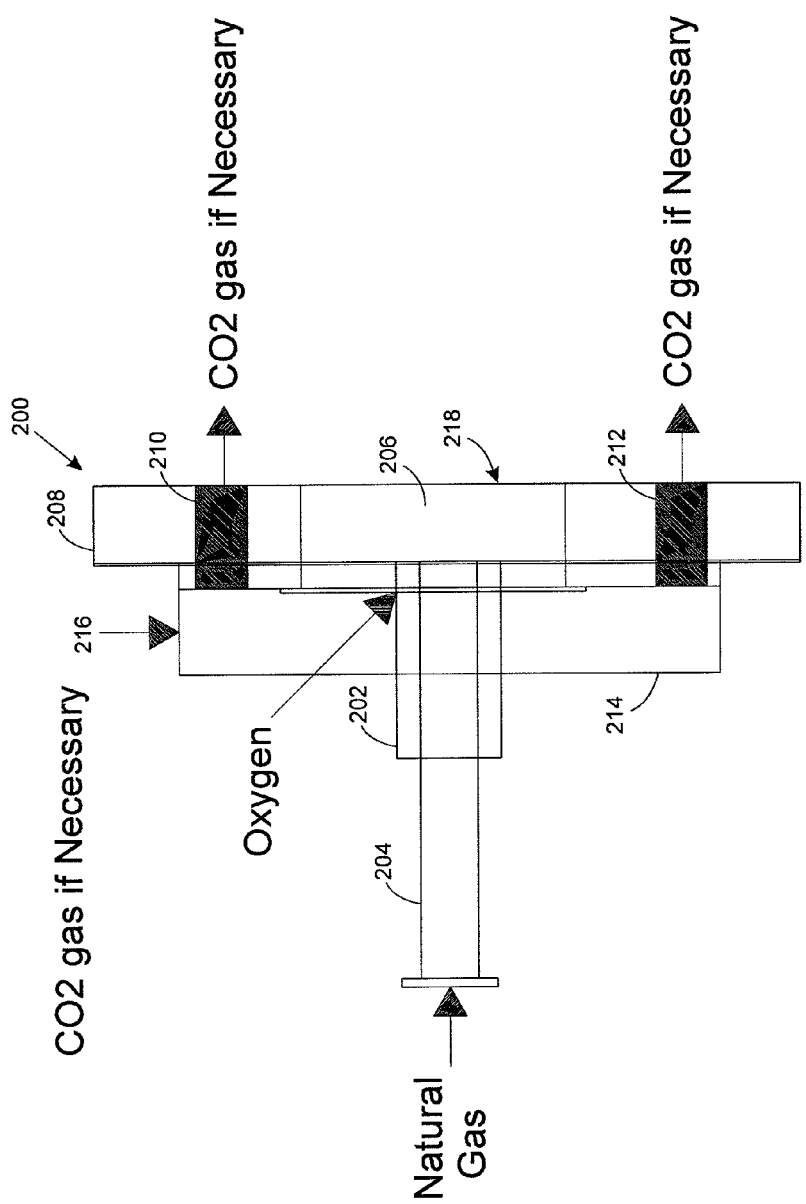
FIG. 7 is an illustration of an alternative gas burner for use with the present invention.

Various types of burners can be used with the present invention. For example, the burners 14 may be designed with specific requirements on orifice sizing and velocities in order to produce a flame with a specific geometry and shape. For example, U.S. Pat. Nos. 5,545,031 and 5,575,637 disclose exemplary burners for use with the present invention for providing exemplary flame shapes Other burners are also suitable for use with the present invention. For example, FIG. 7 illustrates an exemplary gas burner. FIGS. 8 and 9 illustrate exemplary burners for gas and coal, respectively, in which the oxygen inlet nozzle is configured so that the oxygen is mixed with the fuel at the burner tip to prevent potential pre-ignition of the fuel outside of the furnace combustion cavity.

Figure 5:
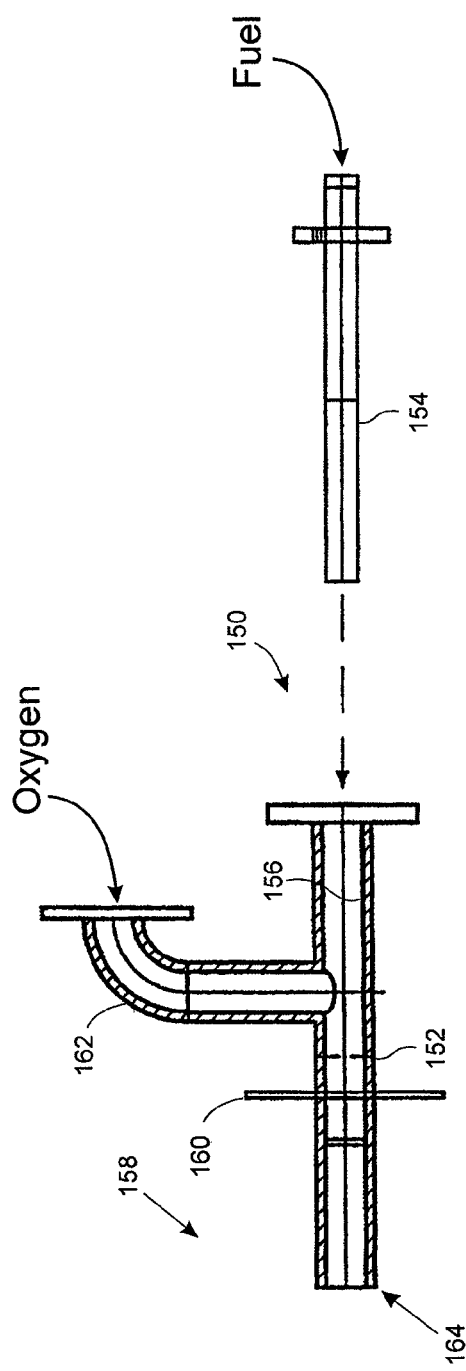
FIG. 5 is an illustration of an exemplary gas burner for use with the present invention.

Referring first to FIG. 5, the burner 150 includes a main inlet nozzle body 152 that extends into the furnace 158. A fuel gas inlet 154 extends into the main inlet body 152 external of the furnace wall 160. Oxygen is input to the main inlet nozzle body 152 by way of the oxygen nozzle 162 and mixes with the fuel gas. An igniter (not shown) extends through a central opening 156 in the main inlet body 152 just past the burner tip 164. The igniter provides a spark for ignition of the fuel/oxygen mixture in the furnace 158.

Figure 6:
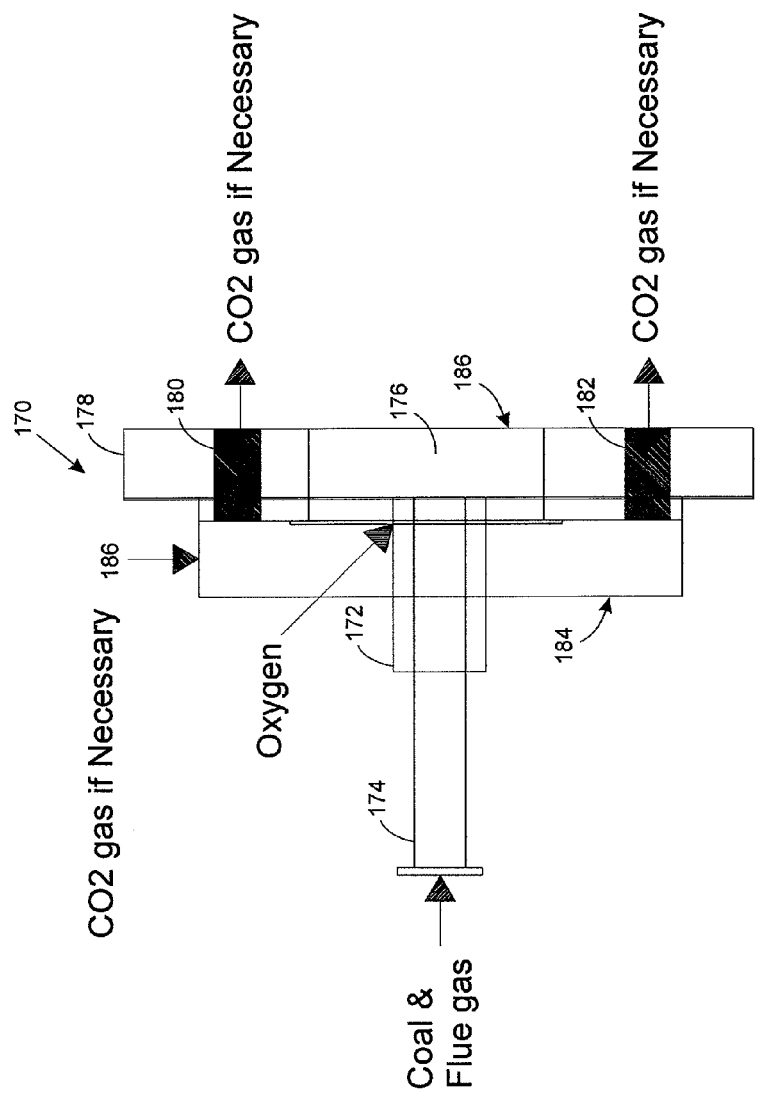
FIG. 6 is an illustration of an exemplary pulverized coal burner for use with the present invention.

FIG. 6 illustrates an alternative burner for use in pulverized coal applications, generally identified with the reference numeral 170, includes an oxygen nozzle 172 and a fuel nozzle 174. In this application, the fuel nozzle 174 is used for a mixture of pulverized coal and a carrier gas, for example, recycled flue gas. More particularly, the pulverized coal is mixed with a carrier gas, downstream of the burner to virtually "fluidize" the pulverized coal dust. The fluidized coal dust is then applied to the fuel nozzle 174.

As shown in FIG. 6, the outlet of the oxygen nozzle 172 and the fuel nozzle 174 discharge together into an opening 176 which defines a chamber in the main burner body 178, where the fuel and oxygen are mixed and ignited by an igniter (not shown). The oxygen nozzle 172 and fuel nozzle 174 outlets are generally aligned as shown and generally discharge at the same boundary of the chamber 176. As such, the chamber 176 defines a virtual burner tip where the fuel and oxygen is mixed and ignited.

The main burner body 178 may be surrounded by one or more openings for receiving $CO_2$ outlet nozzles 180 and 182. The $CO_2$ may be used to temper or adjust the amount of heat transfer in the convective passes of the boiler under certain conditions. The $CO_2$ may be required in certain applications where the heat transfer surfaces of a boiler in the convective section of a boiler require a certain or pre-determined amount of convective gas flow over the tubes to maintain correct process temperatures. The $CO_2$ outlet nozzles 180 and 182 are in fluid communication with a $CO_2$ plenum 184 that is supplied by a CO$_2$ inlet nozzle 186. The CO$_2$ outlet nozzles 180 182 discharge at the boundary of the furnace combustion chamber, identified by the reference numeral 186.

FIG. 7 illustrates an alternate natural gas burner, generally identified with the reference numeral includes an oxygen nozzle 202 and a fuel nozzle 204. In this application, the fuel nozzle 174 is used for natural gas.

As shown in FIG. 7, the outlet of the oxygen nozzle 202 and the fuel nozzle 204 discharge together into an opening 206 which defines a chamber in the main burner body 208, where the fuel and oxygen are mixed and ignited by an igniter (not shown). The oxygen nozzle 202 and fuel nozzle 204 outlets are generally aligned as shown and generally discharge at the same boundary of the chamber 206. As such, chamber 206 defines a virtual burner tip where the fuel and oxygen is mixed and ignited.

The main burner body 208 may include one or more openings for receiving CO$_2$ outlet nozzles 210 and 212. The CO$_2$ outlet nozzles 210 and 212 are in fluid communication with a CO$_2$ plenum 214 that is supplied by a CO$_2$ inlet nozzle 216. The CO$_2$ outlet nozzles 210 and 212 discharge at the boundary of the furnace combustion chamber, identified by the reference numeral 218.

Obviously, many modifications and variations of the present invention are possible in light of the above teachings. Thus, it is to be understood that, within the scope of the appended claims, the invention may be practiced otherwise than as specifically described above.

We claim:

1. A method for performing an oxy-fuel combustion in a combustion system,
   the combustion system comprising
      a plurality of water tubes holding water,
      a combustion chamber comprising a radiant heat zone for a radiant heat transfer, a convective heat zone for a convective heat transfer, and a transition zone for both the radiant heat transfer and the convective heat transfer, the plurality of water tubes forming a wall of the combustion chamber,
      a primary burner having a primary burner flame,
      a super heater disposed in the transition zone, the super heater comprising a temperature set point, and
      a correlated firing rate controller, an oxygen flow rate controller, and a fuel supplier;
   the method comprising the steps of:
      (a) supplying a fossil fuel and substantially pure oxygen to the primary burner;
      (b) burning, by the primary burner, the fossil fuel and the substantially pure oxygen to issue a primary burner radiant heat from the primary burner flame into the radiant zone to convert water in the plurality of water tubes to steam;
      (c) feeding steam from the plurality of water tubes into the super heater;
      (d) measuring an actual temperature of the steam in the super heater;
      (e) determining a first difference between the actual temperature and the temperature set point of the super heater, and, responsive to the first difference, generating a firing rate demand signal;
      (f) measuring a fossil fuel supply rate to the primary burner, and, responsive to the fossil fuel supply rate of the fossil fuel, generating a fuel supply rate reference signal;
      (g) measuring an oxygen supply rate of the substantially pure oxygen to the primary burner, and, responsive to the oxygen supply rate of the substantially pure oxygen, generating an oxygen flow rate signal;
      (h) transmitting the firing rate demand signal and the fuel supply rate reference signal to the correlated firing rate controller and transmitting the oxygen flow rate signal to the oxygen flow rate controller; and
      (j) determining a second difference between the firing rate demand signal and the fuel supply rate reference signal, and, when the second difference is non-zero, responsive to the second difference,
         (1) transmitting, by the correlated firing rate controller, a correlated firing rate signal to the fuel supplier, and, responsive to the correlated firing rate signal, the fuel supplier adjusting the fossil fuel supply rate to optimize the radiant heat transfer from the primary burner according to a formula $RHT \propto T_p^4$, and
         (2) transmitting, by the correlated firing rate controller, the correlated firing rate signal to the oxygen flow rate controller, and, responsive to the correlated firing rate signal, the oxygen flow rate controller adjusting the oxygen supply rate to optimize the radiant heat transfer according to the formula $RHT \propto T_p^4$;
   wherein $T_p$ is a temperature of the primary burner flame and RHT is the radiant heat transfer; further comprising the steps of dynamically maintaining the temperature $T_p$ of the primary burner flame at a predetermined maximum flame temperature by (i) measuring the oxygen supply rate of the substantially pure oxygen to the primary burner, and, responsive to the oxygen supply rate of the substantially pure oxygen, generating an oxygen flow rate signal; (ii) transmitting the oxygen flow rate signal to the oxygen flow rate controller; (iii) determining, responsive to the oxygen supply rate, the temperature $T_p$ of the primary burner flame; and (iv) determining a third difference between the temperature $T_p$ of the primary burner flame and the predetermined maximum flame temperature, (v) adjusting, by the oxygen flow rate controller, the oxygen supply rate to optimize the radiant heat transfer according to the formula $RHT \propto T_p^4$; (vi) repeating steps (i) through (v) while step (j) is performed.

2. A method for performing an oxy-fuel combustion in a combustion system, the combustion system comprising a plurality of water tubes holding water, a combustion chamber comprising a radiant heat zone for a radiant heat transfer, a convective heat zone for a convective heat transfer, and a transition zone for both the radiant heat transfer and the convective heat transfer, the plurality of water tubes forming a wall of the combustion chamber, a primary burner having a primary burner flame, a super heater disposed in the transition zone, the super heater comprising a temperature set point, and a correlated firing rate controller, an oxygen flow rate controller, and a fuel supplier; the method comprising the steps of: (a) supplying a fossil fuel and substantially pure oxygen to the primary burner; (b) burning, by the primary burner, the fossil fuel and the substantially pure oxygen to issue a primary burner radiant heat from the primary burner flame into the radiant zone to convert water in the plurality of water tubes to steam; (c) feeding steam from the plurality of water tubes into the super heater; (d) measuring an actual temperature of the steam in the super heater; (e) determining a first difference between the actual temperature and the temperature set point of the super heater, and, responsive to the first difference, generating a firing rate demand signal; (f) measuring a fossil fuel supply rate to the primary burner, and, responsive to the fossil fuel supply rate of the fossil fuel, generating a fuel supply rate reference signal; (g) measuring an oxygen supply rate of the substantially pure oxygen to the primary burner, and, responsive to the oxygen supply rate of the substantially pure oxygen, generating an oxygen flow rate signal; (h) transmitting the firing rate demand signal and the fuel supply rate reference signal to the correlated firing rate controller and transmitting the oxygen flow rate signal to the oxygen flow rate controller; and (j) determining a second difference between the firing rate demand signal and the fuel supply rate reference signal, and, when the second difference is non-zero, responsive to the second difference, (1) transmitting, by the correlated firing rate controller, a correlated firing rate signal to the fuel supplier, and, responsive to the correlated firing rate signal, the fuel supplier adjusting the fossil fuel supply rate to optimize the radiant heat transfer from the primary burner according to a formula $RHT \propto T_p^4$, and (2) transmitting, by the correlated firing rate controller, the correlated firing rate signal to the oxygen flow rate controller, and, responsive to the correlated firing rate signal, the oxygen flow rate controller adjusting the oxygen supply rate to optimize the radiant heat transfer according to the formula $RHT \propto T_p^4$; wherein $T_p$ is a temperature of the primary burner flame and RHT is the radiant heat transfer; wherein the oxygen flow rate controller is responsive to the correlated firing rate signal within a stoichiometric difference of +/−5% to adjust the oxygen supply rate; further comprising the steps of dynamically maintaining the temperature T, of the primary burner flame at a predetermined maximum flame temperature by (i) measuring the oxygen supply rate of the substantially pure oxygen to the primary burner, and, responsive to the oxygen supply rate of the substantially pure oxygen, generating an oxygen flow rate signal; (ii) transmitting the oxygen flow rate signal to the oxygen flow rate controller; (iii) determining, responsive to the oxygen supply rate, the temperature $T_p$ of the primary burner flame; and (iv) determining a third difference between the temperature $T_p$ of the primary burner flame and the predetermined maximum flame temperature, (v) adjusting, by the oxygen flow rate controller, the oxygen supply rate to optimize the radiant heat transfer according to the formula $RHT \propto T_p^4$; (vi) repeating steps (i) through (v) while step (j) is performed.

3. A method for performing an oxy-fuel combustion in a combustion system,
the combustion system comprising
a plurality of water tubes holding water,
a combustion chamber comprising a radiant heat zone for a radiant heat transfer, a convective heat zone for a convective heat transfer, and a transition zone for both the radiant heat transfer and the convective heat transfer, the plurality of water tubes forming a wall of the combustion chamber,
a primary burner having a primary burner flame,
re-heater disposed in the transition zone, the re-heater comprising a temperature set point, and
a correlated firing rate controller, an oxygen flow rate controller, and a fuel supplier;
the method comprising the steps of:
(a) supplying a fossil fuel and substantially pure oxygen to the primary burner;
(b) burning, by the primary burner, the fossil fuel and the substantially pure oxygen to issue a primary burner radiant heat from the primary burner flame into the radiant zone to convert water in the plurality of water tubes to steam;
(c) feeding steam into the re-heater;
(d) measuring an actual temperature of the steam in the re-heater;
(e) determining a first difference between the actual temperature and the temperature set point of the re-heater, and, responsive to the first difference, generating a firing rate demand signal;
(f) measuring a fossil fuel supply rate to the primary burner, and, responsive to the fossil fuel supply rate of the fossil fuel, generating a fuel supply rate reference signal;
(g) measuring an oxygen supply rate of the substantially pure oxygen to the primary burner, and, responsive to the oxygen supply rate of the substantially pure oxygen, generating an oxygen flow rate signal;
(h) transmitting the firing rate demand signal and the fuel supply rate reference signal to the correlated firing rate controller and transmitting the oxygen flow rate signal to the oxygen flow rate controller; and
(j) determining a second difference between the firing rate demand signal and the supply rate reference signal, and, when the second difference is non-zero, responsive to the second difference,
(1) transmitting, by the correlated firing rate controller, a correlated firing rate signal to the fuel supplier, and, responsive to the correlated firing rate signal, the fuel supplier adjusting the fossil fuel supply rate to optimize the radiant heat transfer from the primary burner according to a formula $RHT \propto T_p^4$, and
(2) transmitting, by the correlated firing rate controller, the correlated firing rate signal to the oxygen flow rate controller, and, responsive to the correlated firing rate signal, the oxygen flow rate controller adjusting the oxygen supply rate to optimize the radiant heat transfer according to the formula $RHT \propto T_p^4$;
wherein $T_p$ is a temperature of the primary burner flame and RHT is the radiant heat transfer; further comprising the steps of dynamically maintaining the temperature $T_p$ of the primary burner flame at a predetermined maximum flame temperature by (i) measuring the oxygen supply rate of the substantially pure oxygen to the primary burner, and, responsive to the oxygen supply rate of the substantially pure oxygen, generating an oxygen flow rate signal; (ii) transmitting the oxygen flow rate signal to the oxygen flow rate controller; (iii) determining, responsive to the oxygen supply rate, the temperature $T_p$ of the primary burner flame; and (iv) determining a third difference between the temperature $T_p$ of the primary burner flame and the predetermined maximum flame temperature, (v) adjusting, by the oxygen flow rate controller, the oxygen supply rate to optimize the radiant heat transfer according to the formula $RHT \propto T_p^4$; (vi) repeating steps (i) through (v) while step (j) is performed.

4. A method for performing an oxy-fuel combustion in a combustion system, the combustion system comprising a plurality of water tubes holding water, a combustion chamber comprising a radiant heat zone for a radiant heat transfer, a convective heat zone for a convective heat transfer, and a transition zone for both the radiant heat transfer and the convective heat transfer, the plurality of water tubes forming a wall of the combustion chamber, a primary burner having a primary burner flame, a re-heater disposed in the transition zone, the re-heater comprising a temperature set point, and a correlated firing rate controller, an oxygen flow rate controller, and a fuel supplier; the method comprising the steps of:

(a) supplying a fossil fuel and substantially pure oxygen to the primary burner; (b) burning, by the primary burner, the fossil fuel and the substantially pure oxygen to issue a primary burner radiant heat from the primary burner flame into the radiant zone to convert water in the plurality of water tubes to steam; (c) feeding steam into the re-heater; (d) measuring an actual temperature of the steam in the re-heater; (e) determining a first difference between the actual temperature and the temperature set point of the re-heater, and, responsive to the first difference, generating a firing rate demand signal; (f) measuring a fossil fuel supply rate to the primary burner, and, responsive to the fossil fuel supply rate of the fossil fuel, generating a fuel supply rate reference signal; (g) measuring an oxygen supply rate of the substantially pure oxygen to the primary burner, and, responsive to the oxygen supply rate of the substantially pure oxygen, generating an oxygen flow rate signal; (h) transmitting the firing rate demand signal and the fuel supply rate reference signal to the correlated firing rate controller and transmitting the oxygen flow rate signal to the oxygen flow rate controller; and (j) determining a second difference between the firing rate demand signal and the fuel supply rate reference signal, and, when the second difference is non-zero, responsive to the second difference, (1) transmitting, by the correlated firing rate controller, a correlated firing rate signal to the fuel supplier, and, responsive to the correlated firing rate signal, the fuel supplier adjusting the fossil fuel supply rate to optimize the radiant heat transfer from the primary burner according to a formula $RHT \propto T_p^4$, and (2) transmitting, by the correlated firing rate controller, the correlated firing rate signal to the oxygen flow rate controller, and, responsive to the correlated firing rate signal, the oxygen flow rate controller adjusting the oxygen supply rate to optimize the radiant heat transfer according to the formula $RHT \propto Tp^4$; wherein $T_p$ is a temperature of the primary burner flame and RHT is the radiant heat transfer; wherein the oxygen flow rate controller is responsive to the correlated firing rate signal within a stoichiometric difference of +/−5% to adjust the oxygen supply rate; and further comprising the steps of dynamically maintaining the temperature T, of the primary burner flame at a predetermined maximum flame temperature by (i) measuring the oxygen supply rate of the substantially pure oxygen to the primary burner, and, responsive to the oxygen supply rate of the substantially pure oxygen, generating an oxygen flow rate signal; (ii) transmitting the oxygen flow rate signal to the oxygen flow rate controller; (iii) determining, responsive to the oxygen supply rate, the temperature $T_p$ of the primary burner flame; and (iv) determining a third difference between the temperature $T_p$ of the primary burner flame and the predetermined maximum flame temperature, (v) adjusting, by the oxygen flow rate controller, the oxygen supply rate to optimize the radiant heat transfer according to the formula $RHT \propto Tp^4$; (vi) repeating steps (i) through (v) while step (j) is performed.

* * * * *